(12) United States Patent
Utaki (10) Patent No.: US 9,482,336 B2
(45) Date of Patent: Nov. 1, 2016

(54) GUIDE SHOE (71) Applicant: TSUBAKIMOTO CHAIN CO., Osaka-shi, Osaka (JP)

(72) Inventor: Akihiko Utaki, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 137 days.

(21) Appl. No.: 14/585,310

(22) Filed: Dec. 30, 2014

(65) Prior Publication Data
US 2015/0204437 A1    Jul. 23, 2015

(30) Foreign Application Priority Data
Jan. 21, 2014   (JP) ................................ 2014-008939

(51) Int. Cl.
*F16H 7/18*     (2006.01)
*F16H 57/05*    (2006.01)

(52) U.S. Cl.
CPC .............. *F16H 57/05* (2013.01); *F16H 7/18* (2013.01); *F16H 2007/185* (2013.01)

(58) Field of Classification Search
CPC .... F16H 2007/185; F16H 7/18; F16H 57/05; F16H 2007/082
See application file for complete search history.

(56) References Cited

U.S. PATENT DOCUMENTS

| 5,779,582 | A | * | 7/1998 | Mott | F16H 7/18 474/140 |
| 5,961,411 | A | * | 10/1999 | Tsutsumi | F16H 7/18 474/111 |
| 6,062,998 | A | * | 5/2000 | Kumakura | F16H 7/18 474/110 |
| 2006/0199689 | A1 | * | 9/2006 | Yoshimoto | F16H 7/18 474/111 |
| 2012/0129636 | A1 | * | 5/2012 | Lee | F16H 7/18 474/111 |
| 2013/0053197 | A1 | * | 2/2013 | Konno | F16H 7/18 474/140 |
| 2015/0204218 | A1 | * | 7/2015 | Utaki | F01M 9/10 474/140 |

FOREIGN PATENT DOCUMENTS

JP     2006-242357 A     9/2006

* cited by examiner

*Primary Examiner* — William E Dondero
*Assistant Examiner* — Robert T Reese
(74) *Attorney, Agent, or Firm* — Westerman, Hattori, Daniels & Adrian, LLP (57) ABSTRACT

An object of the present invention is to provide a guide shoe that can prevent a shortage of lubricating oil and supply the lubricating oil onto a sliding surface of the shoe in a favorable manner. To achieve the above object, the present invention provides a guide shoe that has a shoe surface for slidably guiding a running chain CH. A plate guide groove extending along a chain running direction D and guiding link plates L of the chain CH is provide in the shoe surface. An oil guide part having a pair of guide walls is provided in the bottom surface of the plate guide groove. The pair of guide walls are each formed such as to face a rear side in the chain running direction D and converge to each other toward a front side in the chain running direction D.

8 Claims, 8 Drawing Sheets

GUIDE SHOE

BACKGROUND OF THE INVENTION

1. Field of the Invention

The present invention relates to a guide shoe that has a shoe surface for slidably guiding a running chain.

2. Description of the Related Art

A chain guide has hitherto been known, which is incorporated in a timing system in the engine room of a car to slidably guide the chain running between sprockets and keep an appropriate chain tension (see, for example, Japanese Patent Application Laid-open No. 2006-242357).

This conventional chain guide includes a guide shoe that has a shoe surface for slidably guiding the running chain, and a base member that supports this guide shoe along the longitudinal direction of the guide.

SUMMARY OF THE INVENTION

Lubricating oil is supplied on the shoe surface during use of the conventional chain guide for the purpose of reducing friction between the surface of the guide shoe and the chain, and wear of the shoe surface. However, sometimes there is a shortage of oil or variation in the oil film thickness on the shoe surface, leading to the problem of accelerated wear of the guide shoe due to increased friction between the shoe surface and the chain.

It is also known to provide dimples, grooves, or the like in the shoe surface for the purpose of forming oil pockets in the surface of the guide shoe. While these dimples and the like can function as oil pockets, the lubricating oil held in the dimples or the like could hardly be pulled out onto the sliding shoe surface depending on the viscosity of the lubricating oil and the running speed of the chain, and could not be supplied to the sliding surface of the shoe in a favorable manner.

The present invention is directed at solving these problems and it is an object of the invention to provide a simple-structured guide shoe that can prevent a shortage of lubricating oil and supply the lubricating oil onto the sliding surface of the shoe in a favorable manner.

To solve the problems described above, the present invention provides a guide shoe having a shoe surface for slidably guiding a running chain, including: a plate guide groove provided in the shoe surface, extending along a chain running direction and guiding link plates of the chain; and an oil guide part having a pair of guide walls and formed in a bottom surface of the plate guide groove, the pair of guide walls each being formed such as to face a rear side in the chain running direction and converge to each other toward a front side in the chain running direction.

According to an aspect of the invention as set forth in claim 1, a plate guide groove extending along the chain running direction is provided in the shoe surface to restrict the track for the chain to run on, so that the lubricating oil is held in the plate guide groove to prevent a shortage of oil in portions where the chain slides on. Moreover, an oil guide part having a pair of guide walls that converge to each other toward the front side in the chain running direction is formed in the bottom surface of the plate guide groove, so that the lubricating oil held in oil pockets is guided by the pair of guide walls to approach each other as the chain runs, and the oil film thickness increases due to an oil pressure buildup at the converging portion of the pair of guide walls. Friction between the shoe surface and the chain is thereby reduced, and thus the guide shoe can smoothly guide the chain and exhibit excellent wear resistance.

According to an aspect of the invention as set forth in claim 2, the distance between a plurality of wall-pair converging portions in a shoe width direction as viewed in a chain running direction is set to or smaller than the plate thickness of link plates of the chain. This ensures that each of the plurality of link plates that form the chain runs on the wall-pair converging portions of the walls where the oil film thickness is increased, so that the friction reducing effect can be successfully exploited.

According to an aspect of the invention as set forth in claim 3, each guide wall is formed as a flat surface, so that the pair of guide walls converge to each other linearly. As the lubricating oil is guided linearly toward the wall-pair converging portion of the walls, the pressure of the lubricating oil can be increased even more at the wall-pair converging portion.

According to an aspect of the invention as set forth in claim 4, the pair of guide walls are connected to each other at the wall-pair converging portion, so that the lubricating oil cannot flow anywhere out of the wall-pair converging portion, which improves the oil film forming effect at the wall-pair converging portion.

According to an aspect of the invention as set forth in claim 5, an inclined guide surface inclined toward the plate guide groove is provided on either side of the plate guide groove, so that the link plates of the chain are guided into the plate guide groove by the inclined guide surfaces. This ensures that the link plates runs on portions where the oil film thickness is increased by wall-pair converging portions, and the lubricating oil around the plate guide groove can be guided into the plate guide groove.

According to an aspect of the invention as set forth in claim 6, a plurality of oil guide parts are arranged in a zigzag pattern on the bottom surface of the plate guide groove, so that the oil guide parts can be provided in the bottom surface of the plate guide groove in a high density, and in particular, the distance between the plurality of wall-pair converging portions in the shoe width direction as viewed in the chain running direction can be reduced. This ensures that each of the plurality of link plates that form the chain runs on the parts where the oil film thickness is increased.

According to an aspect of the invention as set forth in claim 7, the plurality of oil guide parts are arranged side by side both in the chain running direction and in the shoe width direction, whereby the burden of production of the guide shoe can be reduced. For example, the production of metal molds for the pattern of the bottom surface of the plate guide groove is made easy.

According to an aspect of the invention as set forth in claim 8, the oil guide part includes a pair of second guide walls arranged to oppose the pair of guide walls on the rear side in the chain running direction of the pair of guide walls. The pair of second guide walls each face the front side in the chain running direction and converge to each other toward the front side in the chain running direction. The pair of second guide walls formed on the rear side of the pair of guide walls can also guide the lubricating oil toward the wall-pair converging portion, so that the oil film forming effect at the wall-pair converging portion of the walls can be improved.

DESCRIPTION OF THE PREFERRED EMBODIMENTS

Hereinafter, a chain guide 100 according to the first embodiment of the present invention will be described with reference to FIG. 1 to FIG. 4.

Figure 1:
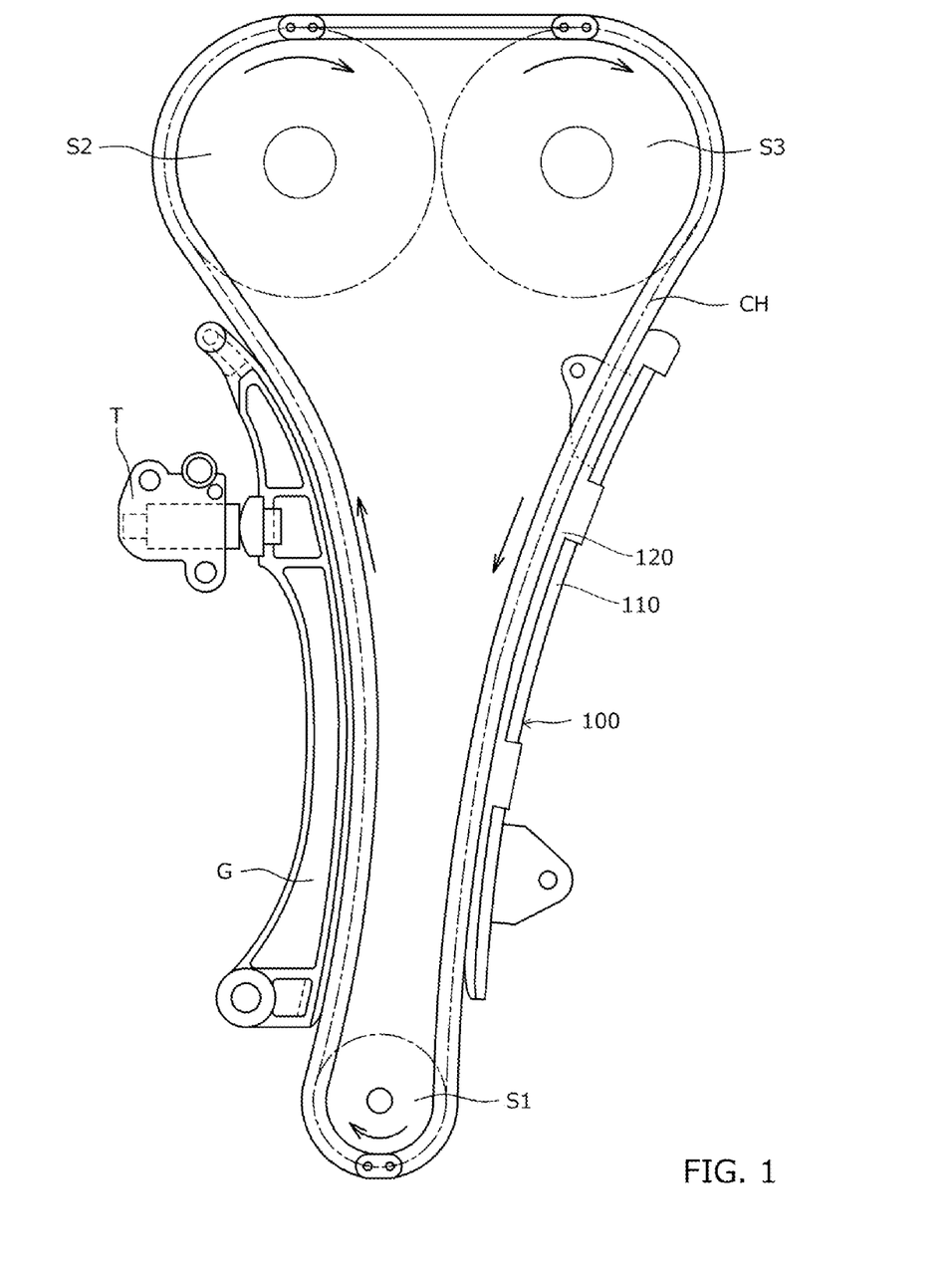
FIG. 1 is a diagram showing a form of use of a guide shoe according to a first embodiment.

The chain guide 100 of the first embodiment is incorporated in a timing system in an engine room, and slidably guides a chain CH running between sprockets S1 to S3 as shown in FIG. 1 to keep an appropriate chain tension. More specifically, the chain guide 100 guides the chain CH passing over the sprockets S1, and S2 and S3 respectively provided to a crankshaft and cam shafts as shown in FIG. 1 to stabilize the running chain CH and keep the tension of the chain CH appropriately. While the chain guide 100 is configured as a fixed guide fixedly installed in the engine room in this embodiment, the chain guide 100 may be configured as a pivot guide G pivotally supported inside the engine room such as the one shown in FIG. 1 and pressed against the chain CH by a tensioner T.

Figure 2:
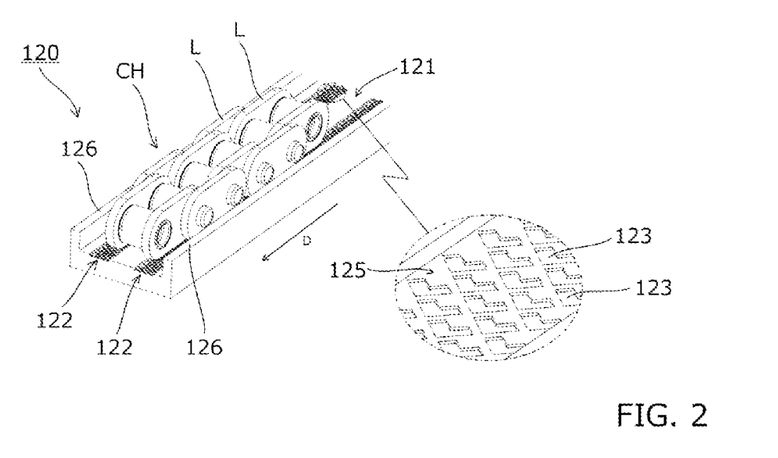
FIG. 2 is an explanatory diagram showing a guide shoe according to the first embodiment.

The chain guide 100 includes, as shown in FIG. 1 and FIG. 2, a guide shoe 120 for slidably guiding the running chain CH, and a metal base member 110 that supports the guide shoe 120 along a chain running direction (longitudinal direction of the guide) D. The base member 110 is fixed to an engine block (not shown) to which the base member is to be mounted.

The guide shoe 120 is made of a synthetic resin material and has a shoe surface 121 extending along the chain running direction D on the side that faces the engine room, and guide sections 126 on both sides in a width direction of the guide shoe 120. Two plate guide grooves 122 extending along the chain running direction D are provided in the shoe surface 121, as shown in FIG. 2. While plate guide grooves 122 in this embodiment are each configured to guide two adjacent link plates L, the plate guide groove 122 is not limited to this specific form. For example, the plate guide groove 122 may be formed to have a width with which it can guide one link plate L.

Figure 3:
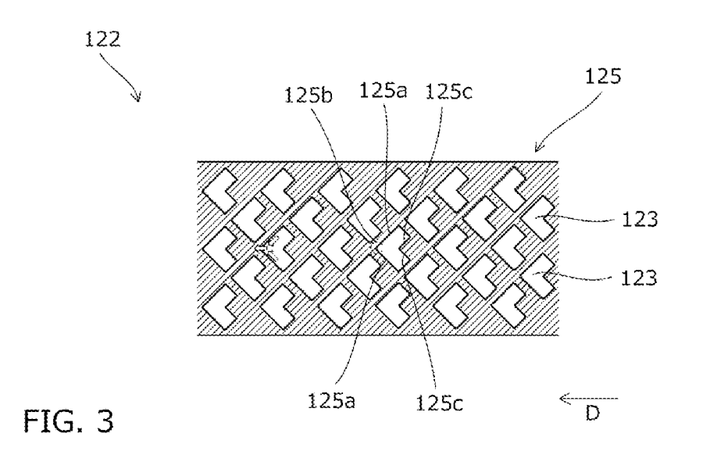
FIG. 3 is an explanatory diagram showing a bottom surface of a plate guide groove according to the first embodiment.

A plurality of diagonal L-shaped indentations 123 are formed in a zigzag pattern in the bottom surface of each plate guide groove 122 as shown in FIG. 2 and FIG. 3, i.e., a plurality of oil guide parts 125 are formed in a zigzag pattern on the bottom surface of the plate guide groove 122. In this embodiment, protruded parts on the bottom surface of the plate guide groove 122 (where no indentations 123 are formed) function as the sliding surface with the chain CH, while the recessed parts in the bottom surface of the plate guide groove 122 (indentations 123) function as oil pockets.

Each oil guide part 125 has a pair of guide walls 125*a* that are inner wall faces on the front side of the indentation 123, a wall-pair converging portion 125*b* where the pair of guide walls 125*a* converge to each other, and a pair of second guide walls 125*c* that are inner wall faces on the rear side of the indentation 123, as shown in FIG. 3.

Each guide wall 125*a* is formed as a flat surface and faces the rear side in the chain running direction D as shown in FIG. 3. The pair of guide walls 125*a* extend diagonally to the chain running direction D toward the front side of the chain running direction D such as to converge and connect to each other at the wall-pair converging portion 125*b*.

Each second guide wall 125*c* is formed as a flat surface, faces the front side in the chain running direction D, and opposes each guide wall 125*a*, as shown in FIG. 3. The pair of second guide walls 125*c* extend diagonally to the chain running direction D toward the front side of the chain running direction D such as to converge and connect to each other.

Figure 4:
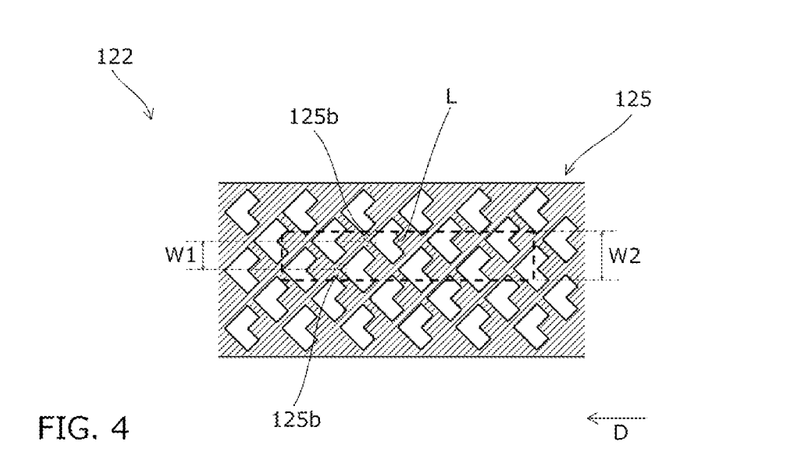
FIG. 4 is a diagram for explaining the distance between wall-pair converging portions of guide walls in the first embodiment.

As viewed in the chain running direction D, the distance W1 in the width direction of the shoe between the plurality of wall-pair converging portions 125*b* is set to or smaller than the plate thickness W2 of link plates L of the chain CH, as shown in FIG. 4.

Next, a modification of the first embodiment will be described with reference to FIG. 5.

Figure 5:
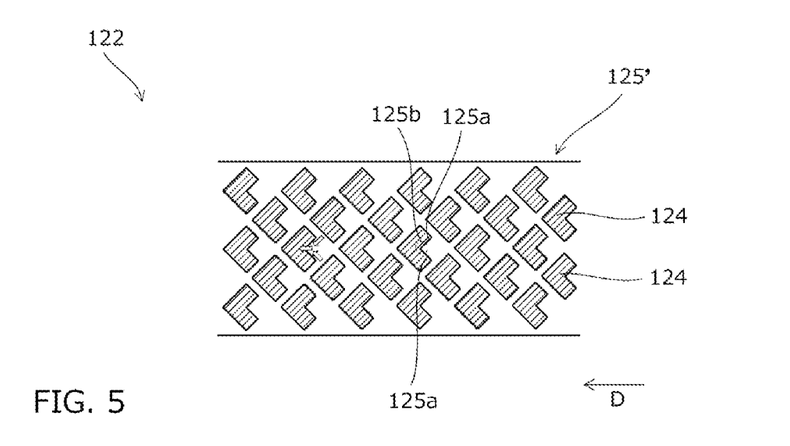
FIG. 5 is an explanatory diagram showing a bottom surface of a plate guide groove according to a modification of the first embodiment.

The difference between the first embodiment shown in FIG. 3 and the modification shown in FIG. 5 is that the concavity and convexity on the bottom surface of the plate guide groove 122 are inverted. More specifically, the indentations 123 in the first embodiment are replaced with protrusions 124. In this modification, protruded parts on the bottom surface of the plate guide groove 122 (protrusions 124) function as the sliding surface with the chain CH, while the recessed parts in the bottom surface of the plate guide groove 122 (where no protrusions 124 are formed) function as oil pockets.

In the modification shown in FIG. 5, each oil guide part 125' has a pair of guide walls 125*a* that are outer wall faces on the rear side of the protrusion 124, and a wall-pair converging portion 125*b* where the pair of guide walls 125*a* converge to each other. Other configurations of the guide walls 125a and wall-pair converging portions 125b in the modification shown in FIG. 5 are the same as those of the first embodiment.

Figure 6:
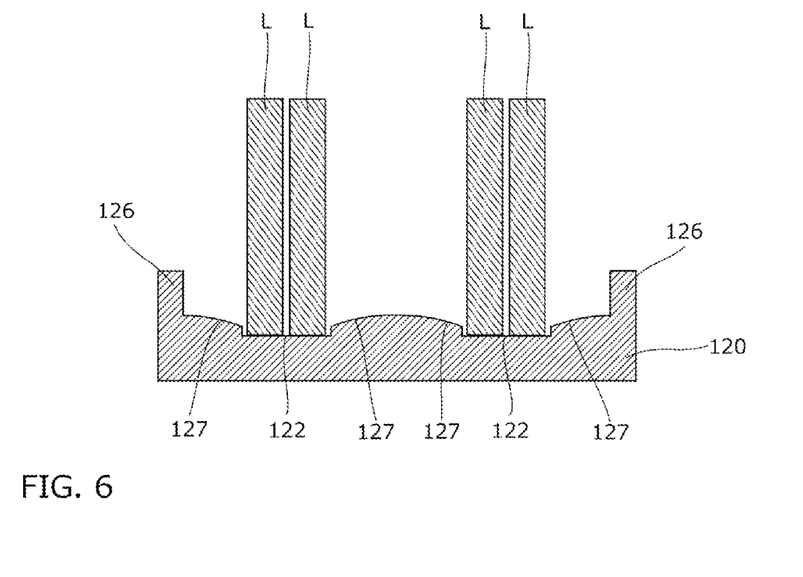
FIG. 6 is a cross-sectional view showing a guide shoe according to a second modification of the first embodiment.

Next, a second modification of the first embodiment will be described with reference to FIG. 6.

In the second modification of the first embodiment, inclined guide surfaces 127 inclined toward the plate guide grooves 122 are provided on both sides in the shoe width direction of the plate guide grooves 122. While the inclined guide surfaces 127 are formed as curved surfaces in the example shown in FIG. 6, they may be formed as flat surfaces.

Next, a chain guide 200 according to the second embodiment will be described with reference to FIG. 7. The second embodiment is basically the same as the previously described first embodiment except for some parts. Therefore, elements of the second embodiment that are identical to those of the first embodiment denoted by numerals beginning with "1" herein and in the drawings will be numbered the same but beginning with "2" instead of "1", and will not be described again.

Figure 7:
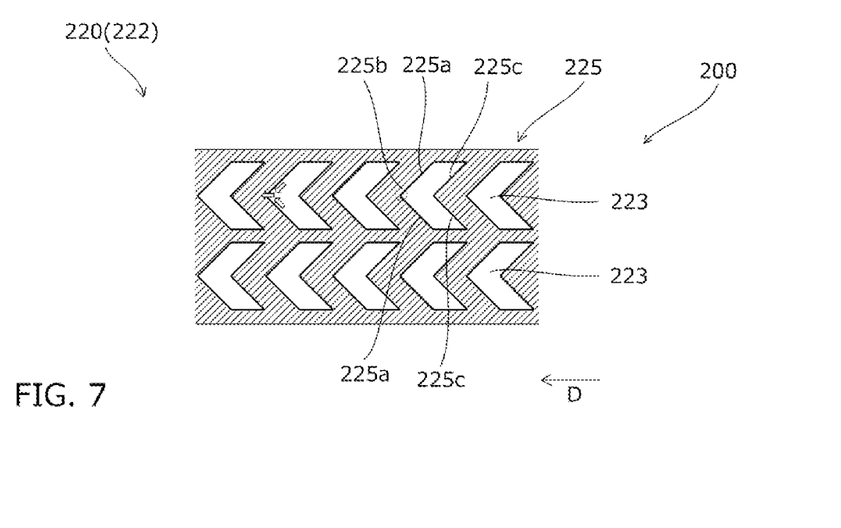
FIG. 7 is an explanatory diagram showing a bottom surface of a plate guide groove according to a second embodiment.

In the chain guide 200 of the second embodiment, as shown in FIG. 7, a plurality of diagonal L-shaped indentations 223 are arranged side by side in the chain running direction D and in the shoe width direction in the bottom surface of the plate guide groove 222, i.e., a plurality of oil guide parts 225 are formed side by side both in the chain running direction D and in the shoe width direction on the bottom surface of the plate guide groove 222.

The oil guide part 225 includes a pair of guide walls 225a, a wall-pair converging portion 225b, and a pair of second guide walls 225c, as shown in FIG. 7. The configurations of various parts of these oil guide parts 225 are the same as those of the first embodiment.

Next, a modification of the second embodiment will be described with reference to FIG. 8.

Figure 8:
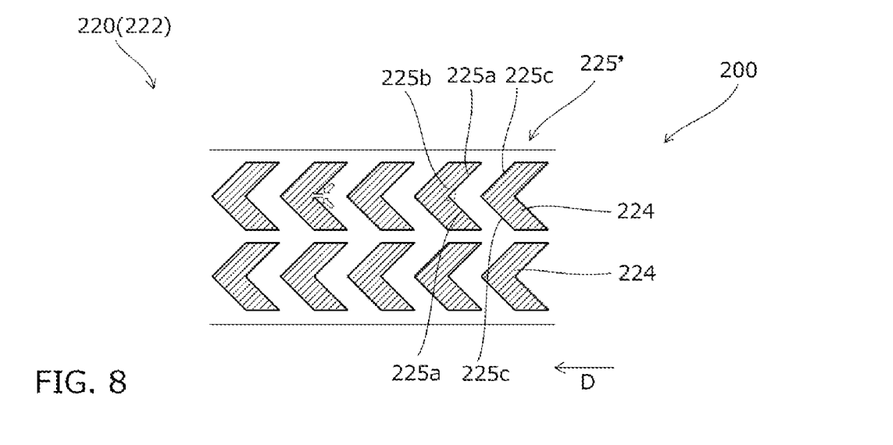
FIG. 8 is an explanatory diagram showing a bottom surface of a plate guide groove according to a modification of the second embodiment.

The difference between the second embodiment shown in FIG. 7 and the modification shown in FIG. 8 is that the concavity and convexity on the bottom surface of the plate guide groove 222 are inverted. More specifically, the indentations 223 in the second embodiment are replaced with protrusions 224.

In the modification shown in FIG. 8, each oil guide part 225' has a pair of guide walls 225a that are outer wall faces on the rear side of the protrusion 224, a wall-pair converging portion 225b where the pair of guide walls 225a converge to each other, and a pair of second guide walls 225c that are outer wall faces on the front side of the protrusion 224 that follows after the protrusion 224 formed with the guide walls 225a. The configurations of various parts of these oil guide parts 225 are the same as those of the first embodiment.

Next, a chain guide 300 according to the third embodiment will be described with reference to FIG. 9. The third embodiment is basically the same as the previously described first embodiment except for some parts. Therefore, elements of the third embodiment that are identical to those of the first embodiment denoted by numerals beginning with "1" herein and in the drawings will be numbered the same but beginning with "3" instead of "1", and will not be described again.

Figure 9:
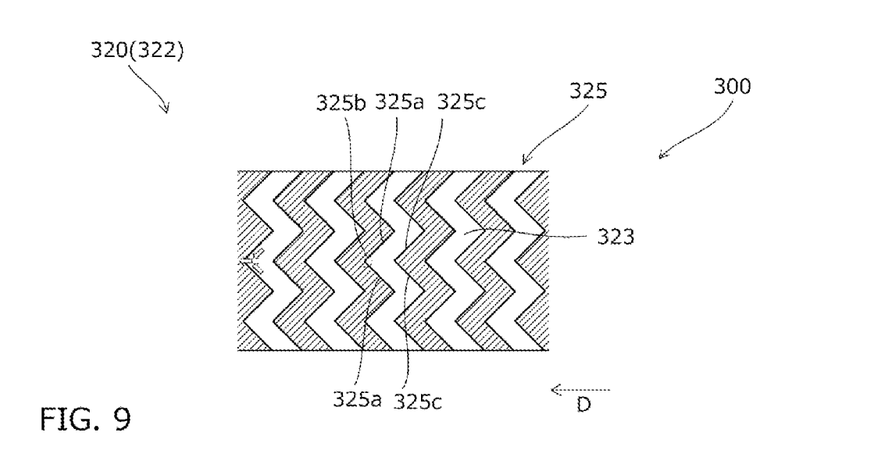
FIG. 9 is an explanatory diagram showing a bottom surface of a plate guide groove according to a third embodiment.

In the chain guide 300 of the third embodiment, as shown in FIG. 9, a plurality of zigzag indentations 323 extending along the shoe width direction are arranged side by side in the chain running direction D in the bottom surface of the plate guide groove 322, i.e., a plurality of oil guide parts 325 are formed side by side both in the chain running direction D and in the shoe width direction on the bottom surface of the plate guide groove 322.

Each oil guide part 325 in the chain guide 300 has a pair of guide walls 325a that are inner wall faces on the front side of the indentation 323, a wall-pair converging portion 325b where the pair of guide walls 325a converge to each other, and a pair of second guide walls 325c that are inner wall faces on the rear side of the indentation 323, as shown in FIG. 9. The configurations of various parts of these oil guide parts 325 are the same as those of the first embodiment.

Next, a chain guide 400 according to the fourth embodiment will be described with reference to FIG. 10. The fourth embodiment is basically the same as the previously described first embodiment except for some parts. Therefore, elements of the fourth embodiment that are identical to those of the first embodiment denoted by numerals beginning with "1" herein and in the drawings will be numbered the same but beginning with "4" instead of "1", and will not be described again.

Figure 10:
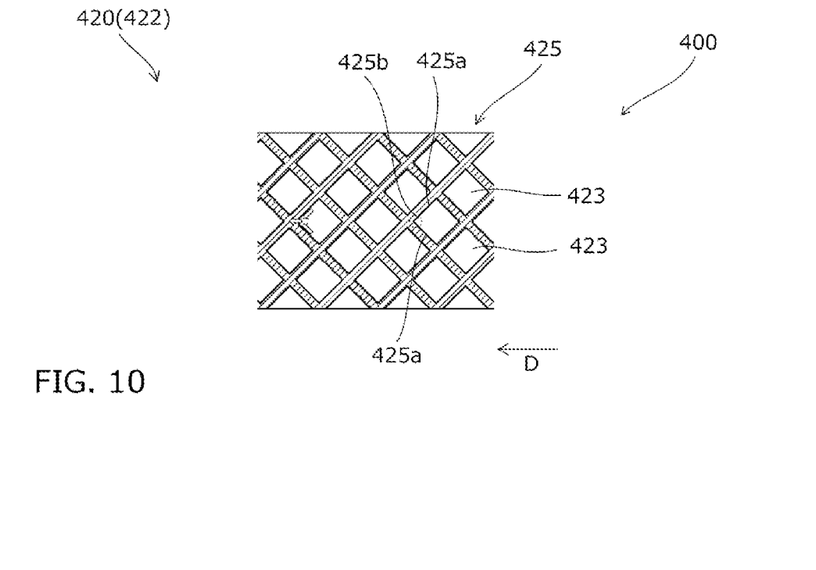
FIG. 10 is an explanatory diagram showing a bottom surface of a plate guide groove according to a fourth embodiment.

In the chain guide 400 of the fourth embodiment, as shown in FIG. 10, a plurality of diamond shaped indentations 423 are formed in a zigzag pattern in the bottom surface of the plate guide groove 422 with their diagonal lines oriented along the chain running direction D (and the width direction of the shoe), i.e., a plurality of oil guide parts 425 are formed in a zigzag pattern on the bottom surface of the plate guide groove 422.

Each oil guide part 425 has a pair of guide walls 425a that are inner wall faces on the front side of the indentation 423, and a wall-pair converging portion 425b where the pair of guide walls 425a converge to each other, as shown in FIG. 10. The configurations of various parts of these oil guide parts 425 are the same as those of the first embodiment.

Next, a modification of the fourth embodiment will be described with reference to FIG. 11.

Figure 11:
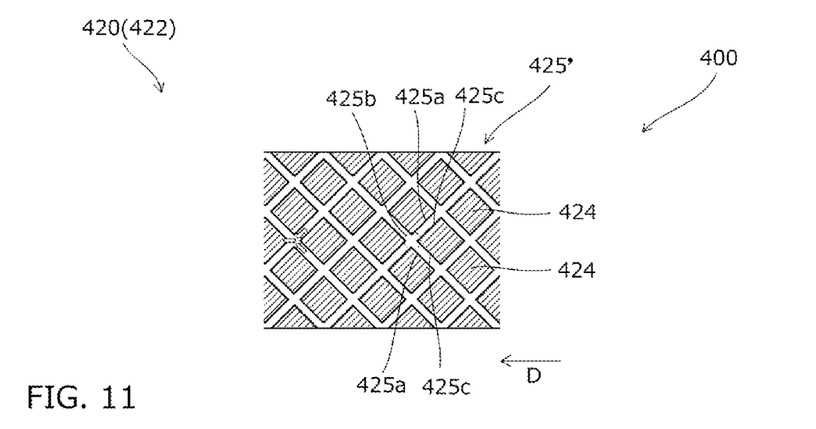
FIG. 11 is an explanatory diagram showing a bottom surface of a plate guide groove according to a modification of the fourth embodiment.

The difference between the fourth embodiment shown in FIG. 10 and the modification shown in FIG. 11 is that the concavity and convexity on the bottom surface of the plate guide groove 422 are inverted. More specifically, the indentations 423 in the fourth embodiment are replaced with protrusions 424.

In the modification shown in FIG. 11, each oil guide part 425' has a pair of guide walls 425a, a wall-pair converging portion 425b where the pair of guide walls 425a converge to each other, and a pair of second guide walls 425c. The pair of guide walls 425a are the outer wall faces on the rear side of the two protrusions 424 adjacent each other in the shoe width direction, while the second guide walls 425c are the outer wall faces on the front side of the protrusion 424 that follows after the aforementioned two protrusions 424. In this modification, the pair of guide walls 425a do not connect to each other at the wall-pair converging portion 425b. The configurations of other parts of these oil guide parts 425 are the same as those of the first embodiment.

Figure 12:
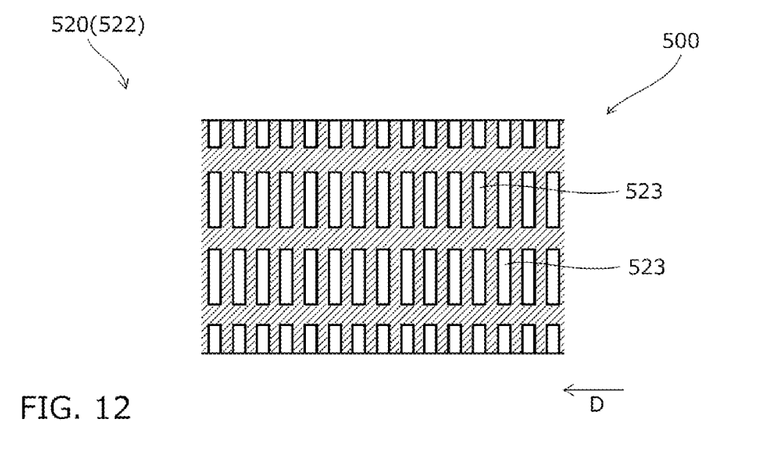
FIG. 12 is an explanatory diagram showing a bottom surface of a plate guide groove according to a first reference example.

Next, a chain guide 500 according to a first reference example will be described with reference to FIG. 12.

In the chain guide 500 of the first reference example, a plurality of rectangular indentations 523 are arranged side by side both in the chain running direction D and in the shoe width direction in the bottom surface of the plate guide groove 522, with their sides oriented along the chain running direction D (and the shoe width direction).

Figure 13:
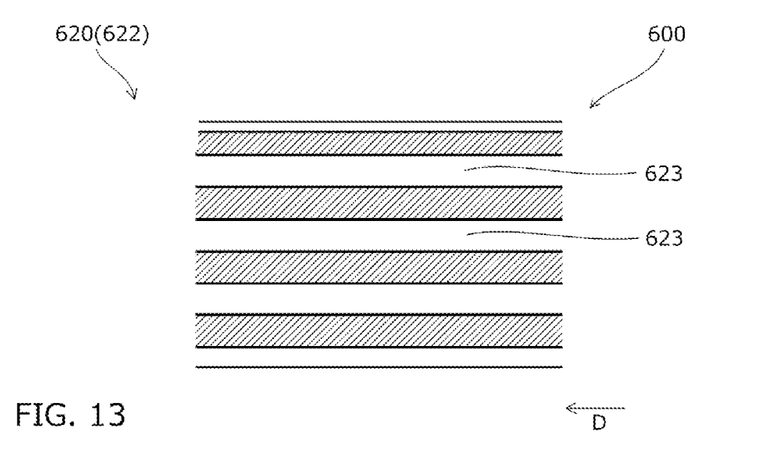
FIG. 13 is an explanatory diagram showing a bottom surface of a plate guide groove according to a second reference example.

Next, a chain guide 600 according to a second reference example will be described with reference to FIG. 13.

The chain guide 600 of the second reference example has a plurality of stripe indentations 623 extending along the chain running direction D and arranged side by side in the shoe width direction in the bottom surface of the plate guide groove 622.

Figure 14:
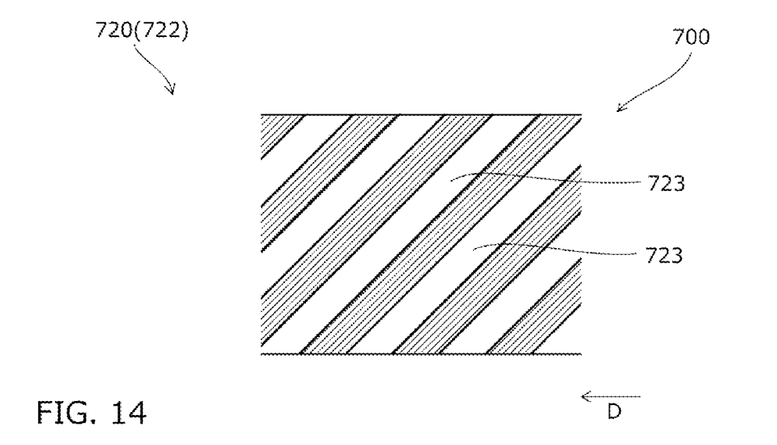
FIG. 14 is an explanatory diagram showing a bottom surface of a plate guide groove according to a third reference example.

Next, a chain guide 700 according to a third reference example will be described with reference to FIG. 14.

The chain guide 700 of the third reference example has a plurality of stripe indentations 723 extending side by side diagonally both to the chain running direction D and the shoe width direction in the bottom surface of the plate guide groove 722.

Figure 15:
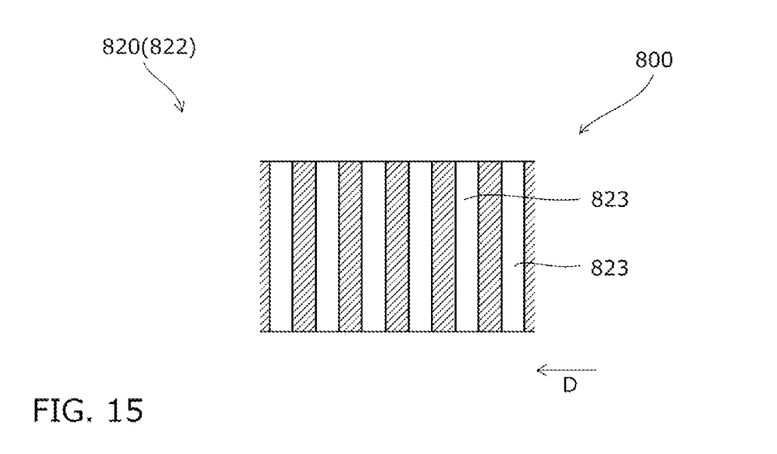
FIG. 15 is an explanatory diagram showing a bottom surface of a plate guide groove according to a fourth reference example.

Next, a chain guide 800 according to a fourth reference example will be described with reference to FIG. 15.

The chain guide 800 of the fourth reference example has a plurality of stripe indentations 823 extending along the shoe width direction and arranged side by side in the chain running direction D in the bottom surface of the plate guide groove 822.

While the guide wall (and second guide wall) in the embodiments and modifications described above are formed as flat surfaces, specific forms of the guide wall (and second guide wall) are not limited to this. For example, the guide wall (and second guide wall) may be formed as a convex or concave curved surface.

The indentations or protrusions in the shoe may have any shapes and arrangements as long as pairs of guide walls are formed such as to converge to each other toward the front side of the chain running direction.

The material of the guide shoe may be selected from known suitable materials in accordance with various conditions such as friction resistance, rigidity, durability, formability, cost, and so on. Synthetic resin materials are particularly suitable.

The material of the base member may be selected from known suitable metal materials in accordance with various conditions such as rigidity, durability, formability, cost, and so on.

The guide shoe and the base member may be formed integral with each other.

Various configurations of the embodiments and modifications shown above may be freely combined to form other chain guides.

What is claimed is:

1. A guide shoe having a shoe surface for slidably guiding a running chain, comprising:
    a plate guide groove provided in the shoe surface, extending along a chain running direction and guiding link plates of the chain; and
    an oil guide part having a pair of guide walls and formed in a bottom surface of the plate guide groove,
    the pair of guide walls each being formed such as to face a rear side in the chain running direction and converge to each other toward a front side in the chain running direction.

2. The guide shoe according to claim 1, wherein the oil guide part is formed in plurality in the bottom surface of the plate guide groove,
    each of the plurality of oil guide parts has a wall-pair converging portion where the pair of guide walls converge to each other, and
    a distance between the plurality of wall-pair converging portions in a shoe width direction as viewed in the chain running direction is set to or smaller than a plate thickness of the link plates of the chain.

3. The guide shoe according to claim 1, wherein the pair of guide walls forming the oil guide part are each formed as a flat surface.

4. The guide shoe according to claim 1, wherein the pair of guide walls forming the oil guide part are connected to each other at a wall-pair converging portion.

5. The guide shoe according to claim 1, further comprising an inclined guide surface provided on either side in a shoe width direction of the plate guide groove and inclined toward the plate guide groove.

6. The guide shoe according to claim 1, wherein the oil guide part is provided in plurality, and the plurality of oil guide parts are arranged in a zigzag pattern on the shoe surface.

7. The guide shoe according to claim 1, wherein the oil guide part is formed in plurality on the shoe surface, and
    the plurality of oil guide parts are arranged side by side both in the chain running direction and in a shoe width direction.

8. The guide shoe according to claim 1, wherein the oil guide part includes a pair of second guide walls arranged to oppose the pair of guide walls on a rear side in the chain running direction of the pair of guide walls, and
    the pair of second guide walls are each formed such as to face the front side in the chain running direction and converge to each other toward the rear side in the chain running direction.

* * * * *